(12) United States Patent
Ennis et al.

(10) Patent No.: US 6,510,581 B1
(45) Date of Patent: Jan. 28, 2003

(54) VEHICLE VACUUM CLEANING SYSTEM

(76) Inventors: G. Thomas Ennis, 235 W. Florence Ave., Inglewood, CA (US) 90301; Richard Mosieur, 235 W. Florence Ave., Inglewood, CA (US) 90301

( * ) Notice: Subject to any disclaimer, the term of this patent is extended or adjusted under 35 U.S.C. 154(b) by 4 days.

(21) Appl. No.: 09/898,041

(22) Filed: Jul. 5, 2001

(51) Int. Cl.[7] ................................. B60S 3/00
(52) U.S. Cl. ............................ 15/315; 15/301; 15/345
(58) Field of Search ................ 15/301, 312.1, 15/312.2, 315, 314, 345

(56) References Cited

U.S. PATENT DOCUMENTS

| | | |
|---|---|---|
| 2,677,629 A | 5/1954 | Buck |
| 3,000,037 A | 9/1961 | Marlo et al. |
| 4,115,896 A | 9/1978 | Costanzo |
| 4,473,409 A | 9/1984 | Greeley |

FOREIGN PATENT DOCUMENTS

| | | |
|---|---|---|
| EP | 0 493 282 * | 7/1992 |
| FR | 2 536 713 | 11/1982 |
| GB | 961995 | 6/1964 |
| GB | 970088 | 9/1964 |
| GB | 1025659 | 4/1966 |

* cited by examiner

Primary Examiner—Terrence R. Till
(74) Attorney, Agent, or Firm—Mattingly, Stanger & Malur, P.C.

(57) ABSTRACT

A vehicle vacuum cleaning system for cleaning the interior of a vehicle having an access opening therein includes a movable bellows housing assembly having a movable bellows frame with a pair of spring biased pivotable sealing members attached thereto. An inlet box having a suction air inlet opening is attached to the bellow frame. Each of the sealing members has a first sealing flap for engaging an inside edge of the access opening on one side thereof and a second sealing flap for engaging a portion around an outer edge of the access opening adjacent the one side. A duct is connected to the air inlet opening and a motor driven fan is connected to the duct for drawing air from inside the vehicle through the access opening and suction air inlet whereby loose material from the vehicle is removed.

16 Claims, 8 Drawing Sheets

VEHICLE VACUUM CLEANING SYSTEM

BACKGROUND OF THE INVENTION

1. Field of the Invention

The present invention relates to a vehicle vacuum cleaning system, and, more particularly, to a vacuum cleaning system for cleaning the interior of a vehicle, primarily a bus.

2. Description of the Related Art

Operators of large passenger vehicle fleets such as buses, street cars and railroad cars are required to spend considerable time and money cleaning the interior of their vehicles to provide suitable transportation for passengers. Cleaning the interior of a large passenger carrying vehicle can be time consuming due to the close spacing and construction of passenger seats which make it difficult to reach certain areas of the floor and walls adjacent the seats with conventional cleaning equipment such as vacuum cleaners, brooms and the like.

Vacuum cleaning systems for the interior of large vehicles such as buses are known wherein a suction inlet is placed in contact with an access door and a worker manually utilizes a hose or other conduit connected to a source of compressed air to manually blow debris and other loose materials in the bus to the suction inlet for disposal in a suitable container. Such systems are disclosed in U.S. Pat. No. 2,677,629 to William J. Buck and U.S. Pat. No. 4,473,409 to Jackie D. Greeley.

The prior art large vehicle vacuum cleaning systems require that an effective seal be maintained between an access opening such as a door and the suction inlet connected to a flow passage. Maintaining effective sealing engagement with and/or around such an access door can be difficult. Moreover, such prior art devices utilize relatively complicated mechanisms for maintaining sealing engagement between the suction inlet and a door.

SUMMARY OF THE INVENTION

It is an object of the present invention to provide a vacuum cleaning system for cleaning the interior of a passenger carrying vehicle such as a bus, which includes means for maintaining effective sealing engagement between an access opening or door of the vehicle and a suction inlet duct of the system.

A further object of the present invention is to provide a vehicle vacuum cleaning system for cleaning the interior of a passenger carrying vehicle such as a bus wherein access opening seals adjust automatically to form an effective air seal inside of the bus door and/or a portion around an outer edge of the access opening.

A further object of the present invention is to provide a vacuum cleaning system for cleaning the interior of a passenger carrying vehicle such as a bus which includes means for manually discharging high pressure air into the interior of the vehicle to move debris and other loose material in the interior of the vehicle to a suction inlet of the system for collection and disposal.

It is still another object of the present invention to provide a vacuum cleaning system for cleaning the interior of a passenger carrying vehicle such as a bus which is relatively simple in construction and economical in cost.

The present invention achieves the above and other objects by providing a vehicle vacuum cleaning system for cleaning the interior of a vehicle having an access opening therein, which has a movable bellows housing assembly. The bellows housing assembly includes a movable bellows frame having an inlet box with a suction air inlet opening attached thereto. A first pivotable sealing member is attached to one side of the bellows frame and a second pivotable sealing member is attached to an opposite side of the bellows frame. Each of the sealing members has a first sealing flap for engaging an inside edge of the vehicle access opening on one side thereof and a second sealing flap for engaging a portion around an outer edge of the access opening adjacent the one side. First and second spring means are provided for biasing the first and second sealing members into sealing engagement with the vehicle. The vacuum cleaning system further includes a duct connected to the suction air inlet opening and a motor driven fan connected to the duct for drawing air from the vehicle through the access opening and the suction air inlet opening whereby loose materials from the interior of the vehicle is removed by the air and discharged into the duct for collection in a suitable container. The system also includes a supporting frame work with the bellows housing assembly being movable with respect thereto by a pair of pneumatic cylinders connected between the bellows frame and the supporting frame work. A linear bearing assembly connected to the frame work and the bellows frame is provided on each side of the system.

The sealing flaps of the system are each comprised of a flap frame, a covered foam rubber stiffener attached to the frame, a flexible cord attached to an outer edge of the frame and an end cover made of a deep pile, fur-like material positioned over the flexible cord. Alternately the stiffeners may be of an inflatable construction. The system further includes a hose attached to a source of air under pressure and an air blaster gun having an air amplifier connected to an outer end of the hose whereby high pressure air may be discharged in the interior of the vehicle to facilitate movement of loose material from the interior of the bus to the suction air inlet opening.

These and other features and advantages of the present invention will become more apparent with reference to the following detailed description and drawings.

DETAILED DESCRIPTION OF THE PREFERRED EMBODIMENTS

Figure 1:
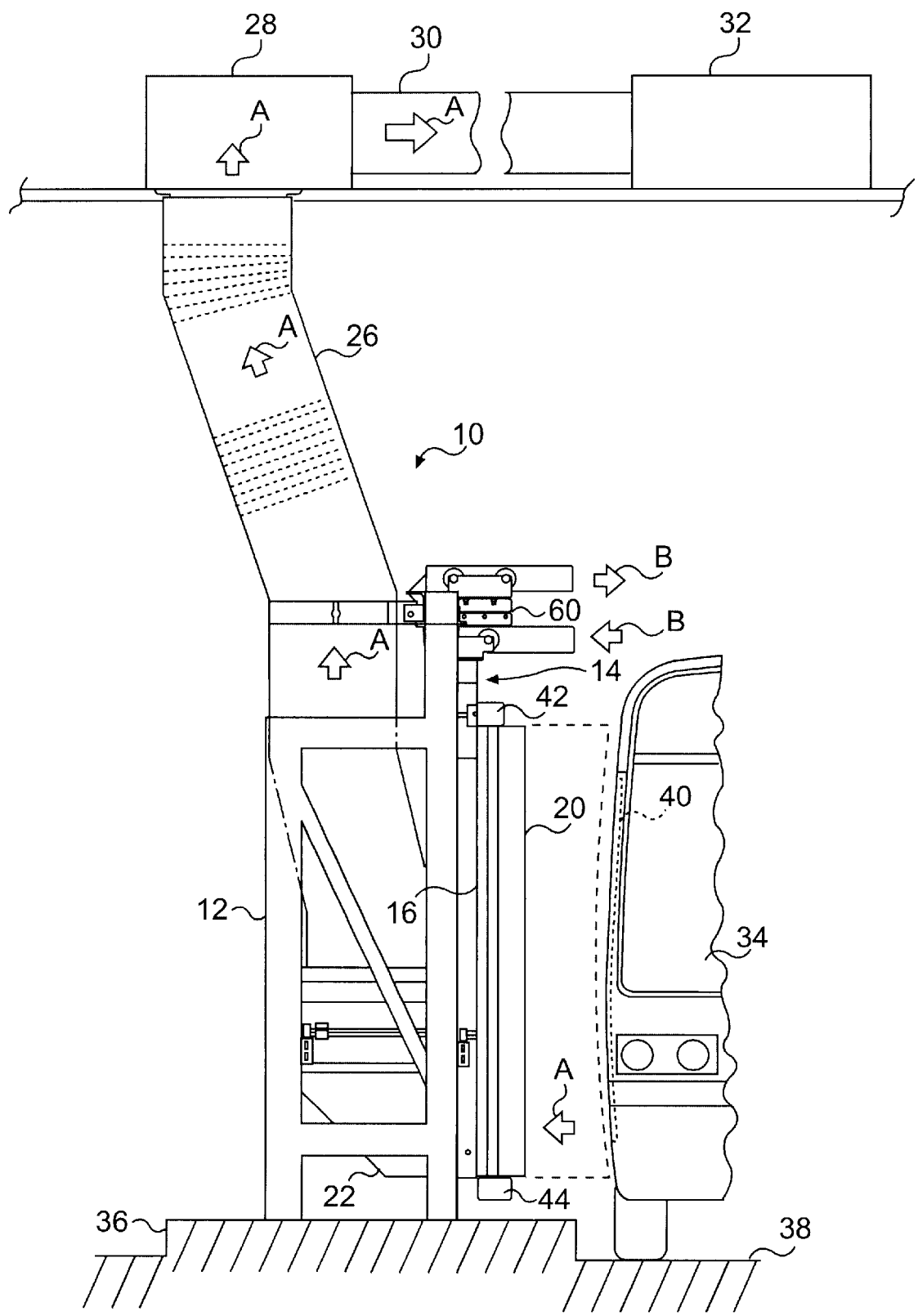
FIG. 1 is a left side elevational view of a vehicle vacuum cleaning system according to the present invention having a bus positioned adjacent thereto.

Referring to the drawings, a vehicle vacuum cleaning system, generally referred to by the numeral 10, is shown.

The system generally includes a supporting frame 12 having a movable bellows housing assembly 14 attached thereto. The bellows housing assembly includes a movable bellows frame 16 having a pivotable right sealing flap 18 and a pivotable left sealing flap 20 attached to the front thereof. An inlet box 22 having a suction air inlet opening 24 is attached to the lower portion of the bellows frame 16. A flexible duct 26 is attached at its lower end to the top of the inlet box 22 and at its upper end to a motor driven, centrifugal fan which is part of a centrifugal dust and debris separator 28. The duct may be constructed of a neoprene impregnated polyester or other suitable material. A discharge conduit 30 is connected at one end to the centrifugal dust and debris separator 28 and at its other end to a container 32 for collecting trash, debris and other loose materials that are removed from the interior of a passenger vehicle such as a bus 34, shown in FIG. 1 as being positioned adjacent the vehicle vacuum cleaning system 10. When the system is in operation, an air flow in the direction of the arrows A in FIG. 1 is created.

As further shown in FIG. 1 the vacuum cleaning system 10 preferably is securely mounted on a suitable base 36 which may be constructed of concrete or the like. The base 36 is constructed to be higher than an adjacent drive path 38 for the bus or other vehicle 34 having an access opening or door 40 in a front portion of a side wall thereof.

Figure 9:
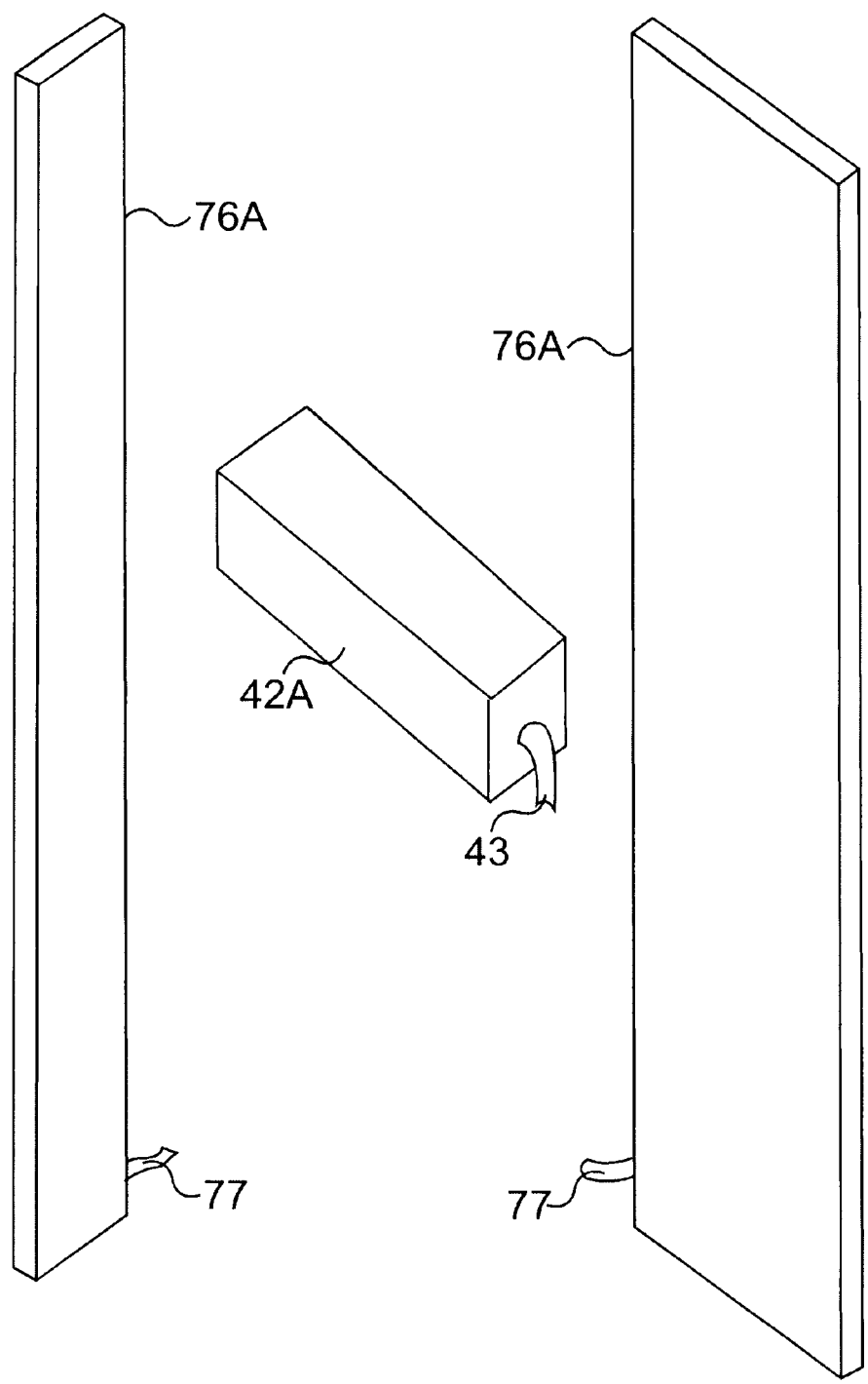
FIG. 9 is an enlarged isometric view of a pair of inflatable stiffener members which are used in the sealing flaps and inflatable bumper seals in another embodiment of the invention.

A top bumper seal member 42 is attached adjacent the top of the bellows frame 60 at a position immediately above the right and left sealing flaps and a bottom bumper seal member 44 is attached adjacent a bottom of the bellows frame 16 immediately below the right and left sealing flaps. The top and bottom seal members may be constructed of a vinyl covered, closed cell foam rubber or other suitable material. Alternatively, as shown in FIG. 9, the top and bottom seal members may be of an inflatable construction from rubber or other suitable material. Only a top seal member 42A having an inlet hose or opening 43 is shown in FIG. 9.

Figure 4:
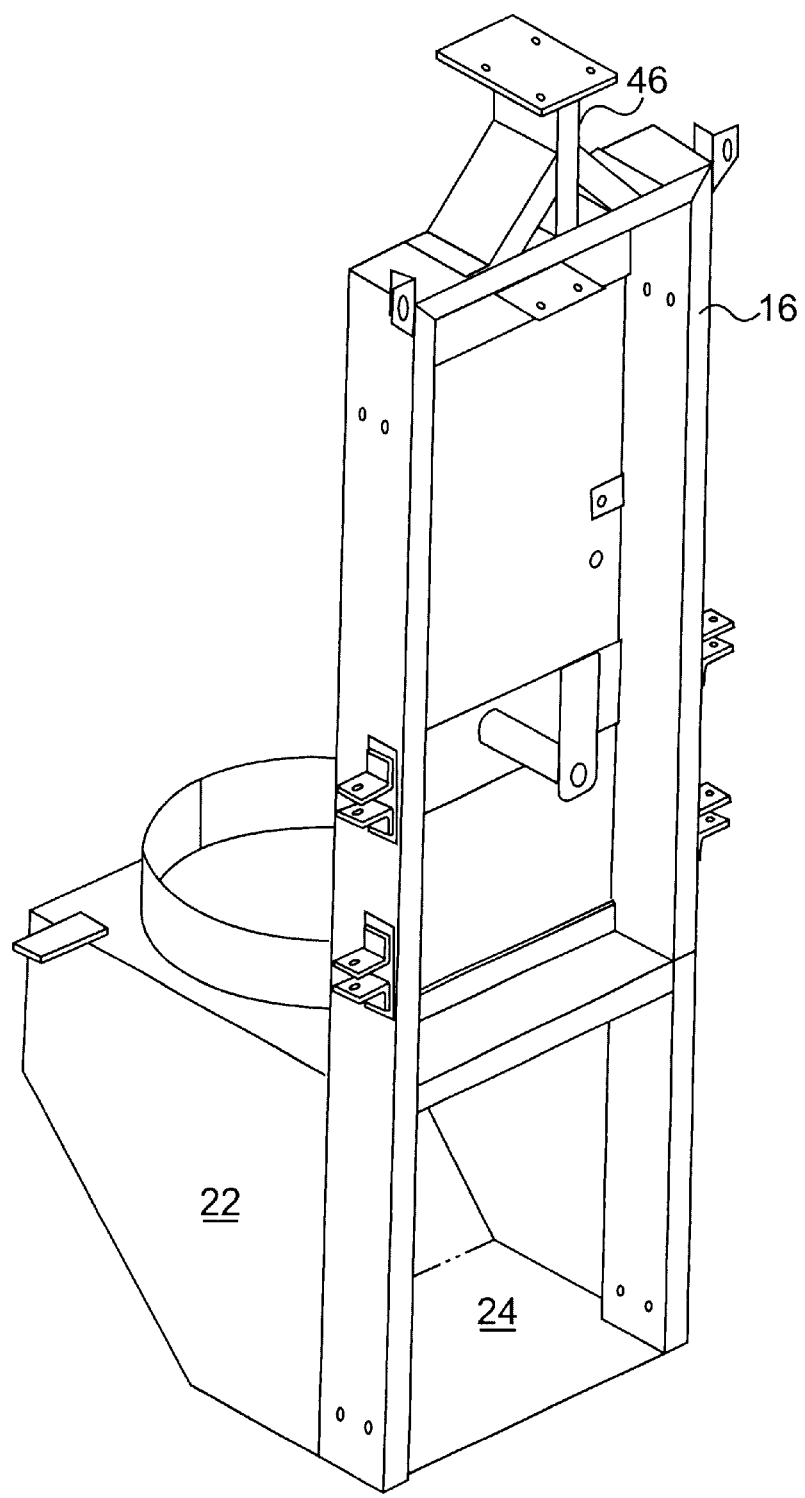
FIG. 4 is an enlarged front left isometric view of a bellows assembly frame of the present invention.

As shown in FIG. 4, a top bracket 46 is fixedly mounted by any suitable means, such as welding, to the top of the bellows frame 16.

Figure 2:
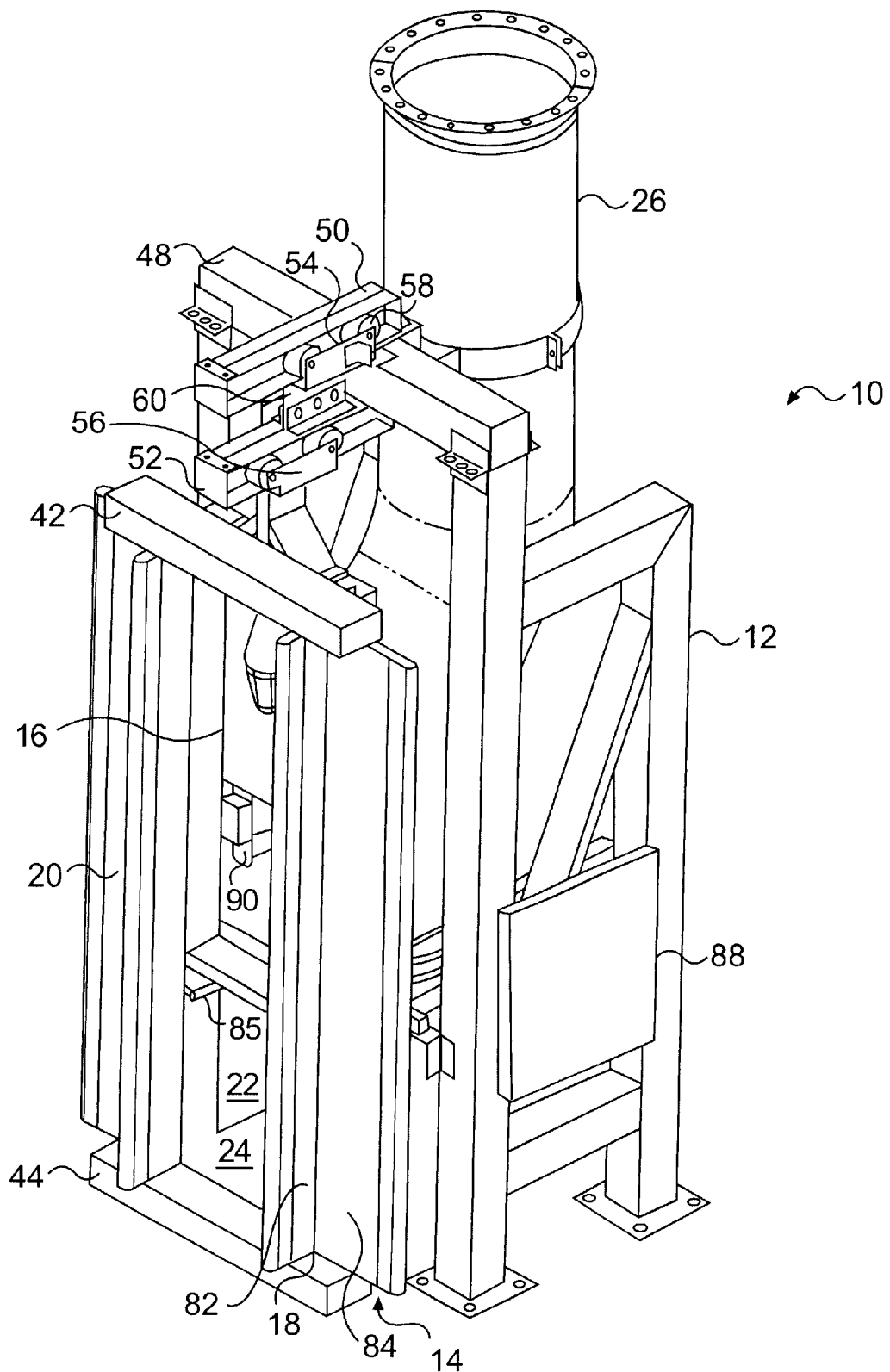
FIG. 2 is a front right isometric view of the vehicle vacuum cleaning system according to the present invention.

The supporting frame 12 has a horizontal top member 48 having an upper roller guide 50 securely attached to the top thereof and a lower roller guide 52 securely attached to the bottom thereof as shown in FIG. 2. Each of the roller guides is provided with a channel on each side thereof. An upper roller assembly 54 is movably attached to the upper roller guide 50 by four rollers 58 made of ultra high molecular weight plastic. Two rollers engage a channel on one side of the upper roller guide and two rollers engage a channel on the opposite side of the upper roller guide. Similarly, a lower roller assembly 56 is movably attached to the lower roller guide 52 and has four wheels 58 of ultra high molecular weight plastic. Two of the rollers engage a channel on one side of the lower roller guide and two of the rollers engage a channel on the opposite side of the lower roller guide. The upper roller assembly and the lower roller assembly are connected by a suitable bracket 60 as shown in FIGS. 1 and 2. Accordingly, both the upper roller assembly 54 and the lower roller assembly 56 are movable in unison along the upper roller guide 50 and the lower roller guide 52, respectively.

Figure 6:
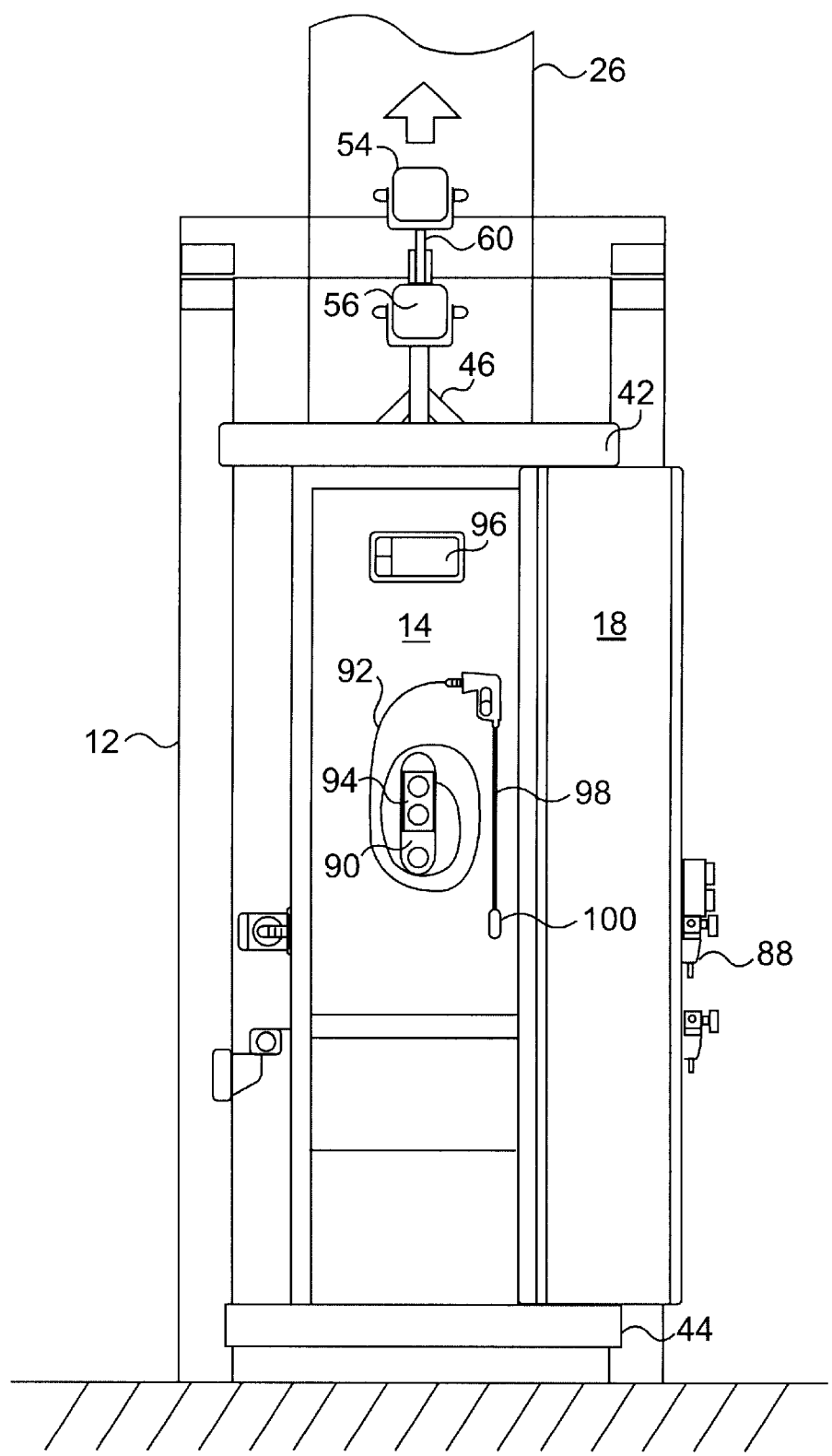
FIG. 6 is a front elevational view of the vehicle vacuum cleaning system with the left sealing flap removed.

The bottom roller assembly 56 is fixedly secured to the top of top bracket 46 attached to the top of the bellows frame 16 as shown in FIG. 6. Accordingly, the roller assemblies 54 and 56 support the bellows housing assembly for movement along the upper and lower roller guides.

Figure 3:
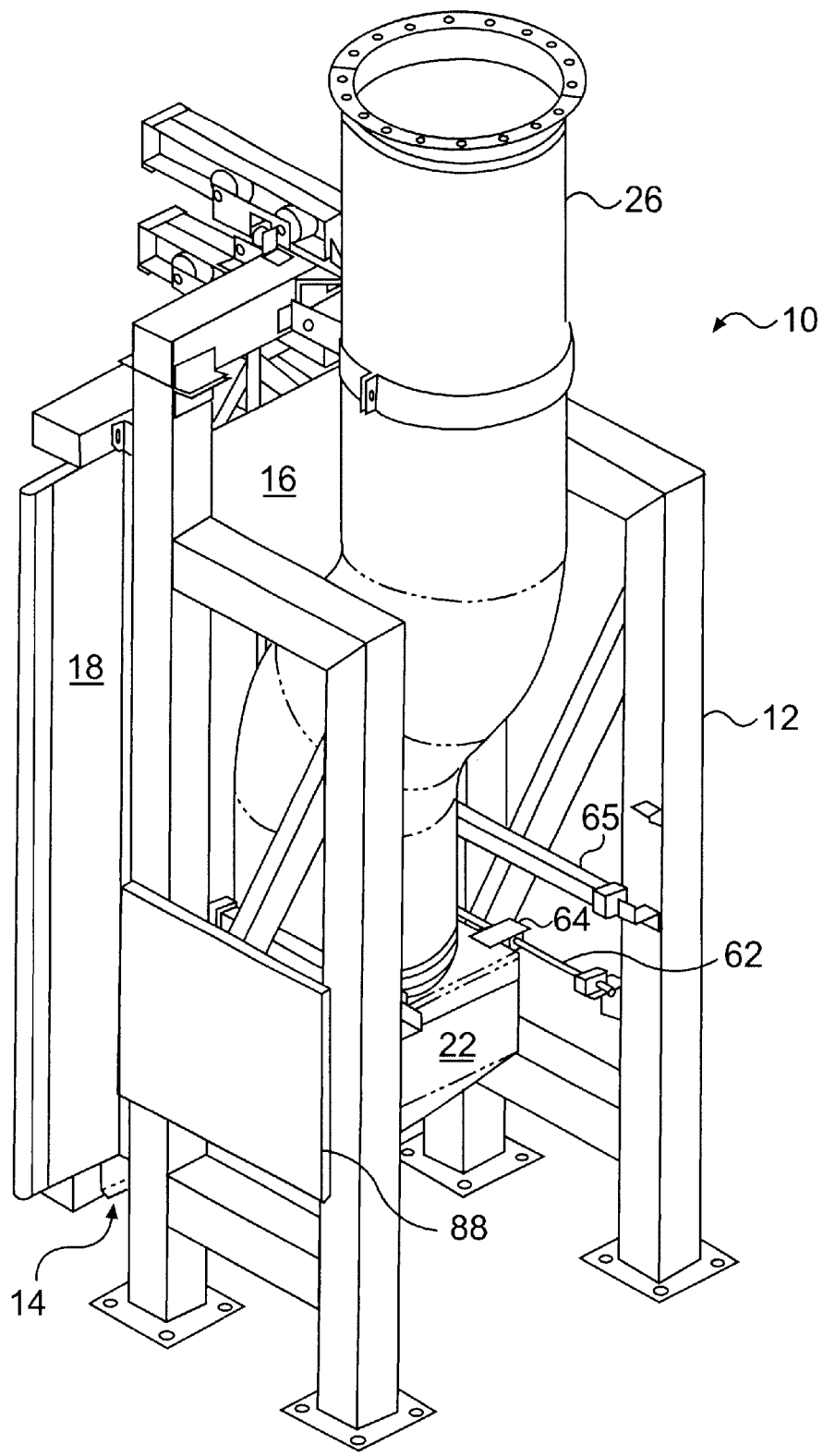
FIG. 3 is a back right isometric view of the vehicle vacuum cleaning system.

As shown in FIG. 3, a rod 62 is attached to each side of the supporting frame 12 at the lower end thereof. A linear bearing 64 is attached to each side of the upper end of inlet box 22. Each linear bearing 64 is slidably engaged with a rod 62 whereby the lower portion of the bellows housing assembly is stabilized as the bellow housing assembly is extended and retracted.

A pneumatic cylinder 65 is provided on each side of the bellows housing assembly for extending and retracting the bellows housing assembly. The arrows one end of each pneumatic air cylinder is attached to the supporting frame 12 while the other end of each pneumatic cylinder is attached to the bellows frame 16 whereby extension and retraction of the cylinder rod of each air cylinder causes the bellows housing assembly to extend or retract. The extension and retraction directions are indicated by the arrows B in FIG. 1.

Figure 5:
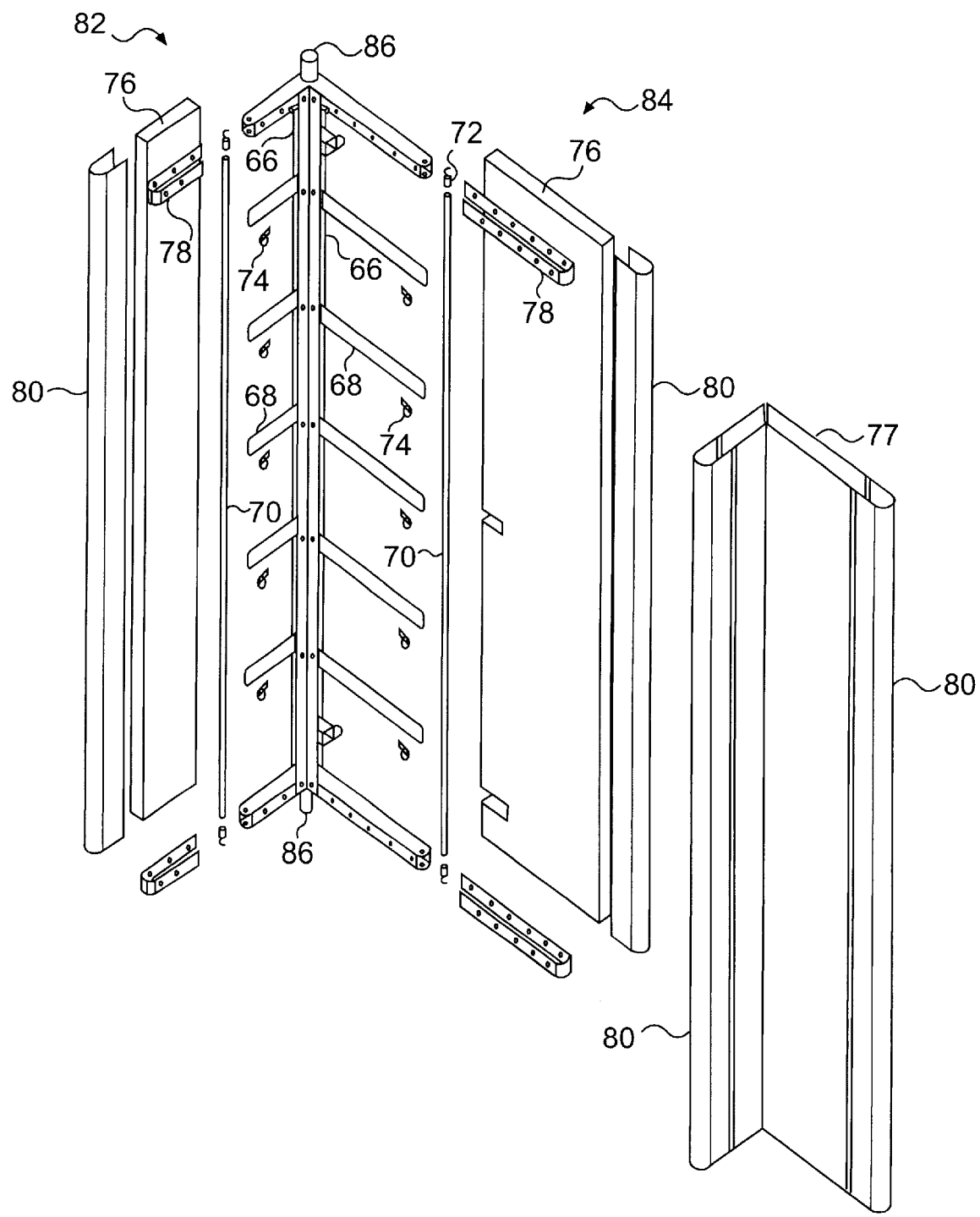
FIG. 5 is an enlarged, exploded right isometric view of a sealing flap according to the present invention.

As shown in FIG. 5, each sealing member 18, 20 is comprised of a pair of sealing flaps 82, 84 fixedly secured perpendicular to each other. Each sealing flap is comprised of a frame formed by an elongated aluminum inner end member 66 having a plurality of spaced ribs 68 of ultra high molecular weight plastic extending out from one side thereof. A flexible cord 70 is attached to the ends of the ribs by a hook connector 72 at the top and bottom and by loop clamps 74 between the top and bottom. The flexible cord may be a bungy cord. A stiffener 76 of foam rubber or other suitable material is attached to the ribs 68. The stiffener preferably is covered with a vinyl cover 77. A bent felt strip 78 is positioned over the ribs at the top and bottom of the frame so that the felt strip cushions the stiffener 76 from the ribs when the stiffener is attached thereto.

An outer end cover 80 is provided at the end of each flap over the flexible cord 70. The end cover may be made of a deep pile, fur-like material. A suitable material is a deep pile, tufted (randomly oriented) mono-filament fibrous material manufactured by Borg Fabrics, of New York, New York. The fabric is a deep pile material having a fur-like appearance and preferably has a thickness or depth of from ¼ of an inch to 1 inch. The fibers of the material are 85% polyester and 15% acrylic. The material is in the form of a thick cluster of tufted mono-filament fibers upstanding from a woven base which provides a fabric layer. The base is made of 100% polyester or other comparable materials.

In another embodiment of the invention, the stiffeners of the sealing flaps may be of an inflatable construction from rubber or other suitable material as designated by the numerals 76A in FIG. 9. The inflatable stiffeners are each provided with a tube member 77 or other suitable opening for admitting discharging gas such as air.

When assembled, each sealing member has a first sealing flap 82 and a second sealing flap 84 extending perpendicularly to the first sealing flap with the second sealing flap 84 being wider than the first sealing flap 82 as shown in FIGS. 2 and 5. As also shown in FIG. 5, each sealing member 18, 20 is provided with a short cylindrical rod 86 at the top and at the bottom thereof which functions as a pivot point for the sealing members.

Each sealing member 18 and 20 is biased to a closed or sealing position by a spring 85 connected at one end to a sealing member and at the other end to the bellows frame 16 as shown in FIG. 2. While only one spring is shown for the left sealing member in FIG. 2, an identical spring is connected to the right sealing member.

A control panel 88 is mounted to the support frame on the right side thereof as shown in FIGS. 2 and 3. The control panel contains controls for the pneumatic and electrical systems and includes an auxiliary start/stop switch.

As shown in FIGS. 2 and 6, the system further includes an L-shaped bracket or caddy 90 attached centrally of the front of the bellows housing assembly 14 for holding a length of hose 92 attached to a source of air under pressure. The bracket 90 also has a start/stop switch 94 mounted to the front thereof.

A light 96 is also mounted on the front of the bellows housing assembly 14 at a position above the bracket 90.

An air blaster gun 98 having an air amplifier 100 at the outer end thereof and a trigger handle 102 at the inner end thereof is attached to the end of the air hose 92. Since, for safety reasons, the source of air under pressure is supplied at a low pressure, it is necessary to increase the pressure of the air coming from the air blaster gun by using an air amplifier of a known construction. Such an air amplifier, for example, is manufactured by Exair.

Figure 7:
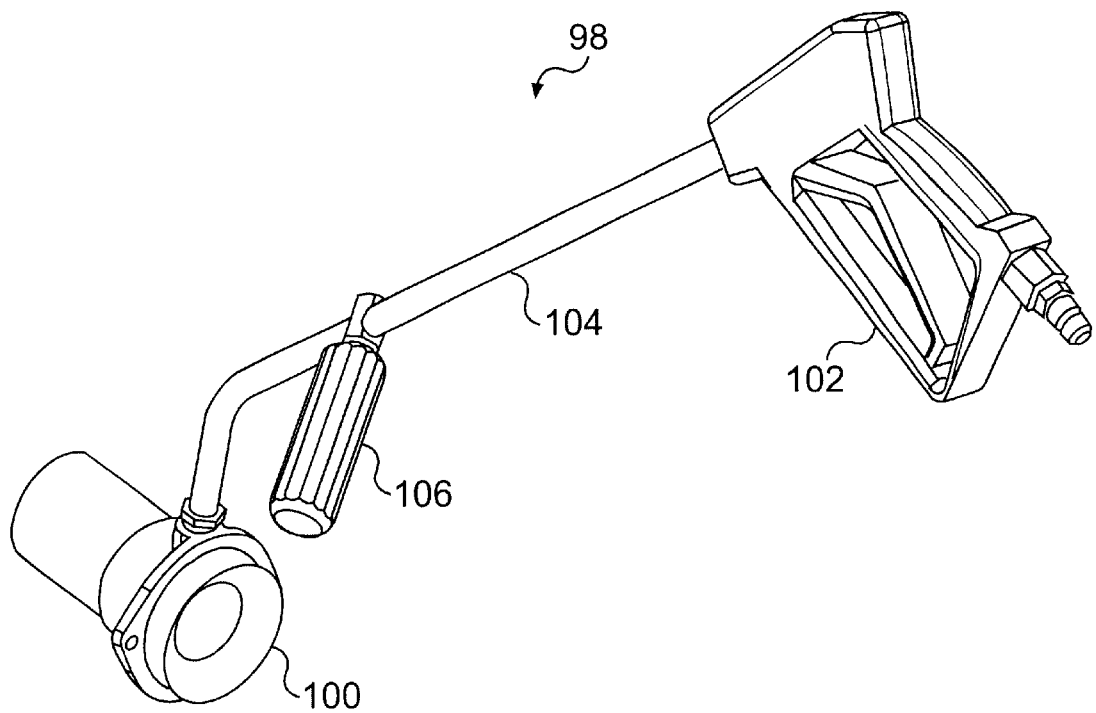
FIG. 7 is an enlarged perspective view of an embodiment of an air blaster gun according to the present invention.
Figure 8:
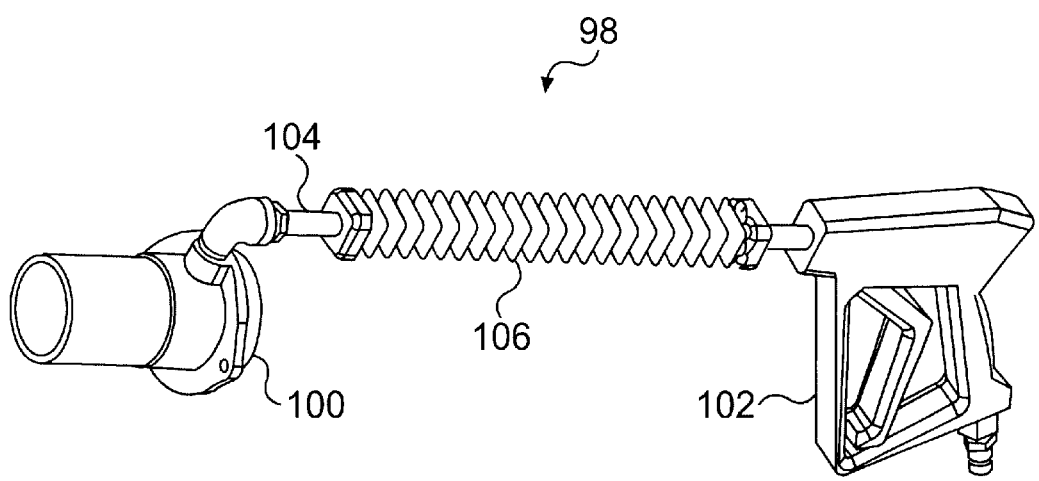
FIG. 8 is an enlarged perspective view of another embodiment of an air blaster gun according to the present invention.

The air blaster gun may have two different embodiments as shown in FIGS. 7 and 8. In the first embodiment shown in FIG. 7, the pipe portion 104 is bent towards the outer end thereof and has a grip 106 extending at right angles therefrom. In the embodiment shown in FIG. 8, the pipe portion 104 is straight and the grip 106 surrounds a part of the straight pipe portion 104 of the air blaster gun.

In operation of the vehicle vacuum cleaning system of the present invention, a bus or other vehicle operator drives the vehicle up to the vacuum cleaning system and positions the bus with the front door open so that the center of the door is aligned with the center of the movable bellows housing assembly. The bottom bumper seal members 44 and/or the bottom of the inlet box 22 may be provided with an indicator, such as a painted stripe, at the center thereof to assist an operator in centering the door with respect to the inlet box. The operator then pushes the start button located on the L-shaped bracket attached to the front of the bellows housing assembly to start the system. Pushing of the start button causes the bellows housing assembly to extend towards the vehicle until the sealing members adjust automatically, due to the action of the springs, to form an air seal with the inside of the bus door and/or a portion around an outer edge of the bus door or access opening. In the case where the vehicle has a folding door, an air seal is formed against the folded door as well as the inside of the door. Activating of the start switch also starts the motor driven fan to cause air to be sucked from the inside of the bus through the door and the suction air inlet opening and into the flexible duct. After activating the start switch, the operator pulls the air blaster gun and attached hose from off the hanger on the bellows housing assembly and walks to the end of the bus. The operator then turns around and points the air blaster gun towards the front of the bus and pulls the trigger to start the discharge of high pressure air which moves debris and other loose materials from off the floor and seats and towards the front of the bus. As the operator moves forwardly, the debris and other loose materials continue to be moved toward the front of the bus until they are discharged out through the door of the vehicle and through the suction inlet air opening into the flexible duct. The debris and other loose materials are then passed through the motor driven centrifugal fan and the centrifugal dust and debris separator and discharged into a suitable container or other collection device. Upon completion of the cleaning operation, the operator then pushes the stop button on the switch whereupon the fan stops and the bellows housing assembly retracts away from the door of the vehicle. The operator may then drive the vehicle away.

The vehicle vacuum cleaning system of the present invention affords many advantages. Each sealing member has two sealing flaps perpendicular to each other whereby the first sealing flap forms a seal against the inside of the door of the vehicle and the second sealing flap forms an air seal around an outer edge of the door. Moreover, each pivotable sealing member is spring-loaded or biased which allows the sealing members to adjust automatically to form an air seal. The use of springs also simplifies the construction of the system since no hydraulic, pneumatic or electrical switches are required to control the sealing members.

Numerous other modifications and adaptations of the present invention will be apparent to those skilled in the art and thus, it is intended by the following claims to cover all such modifications and adaptations which fall within the true spirit and scope of the invention.

We claim:

1. A vehicle vacuum cleaning system for cleaning the interior of a vehicle having an access opening therein, comprising:
    a movable bellows housing assembly, said bellows housing assembly including:
        a movable bellows frame;
        an inlet box having a suction air inlet opening attached to said frame;
        a first pivotable sealing member attached to one side of said bellows frame;
        a second pivotable sealing member attached to an opposite side of said bellows frame;
        each of said sealing members having a first sealing flap for engaging an inside edge of said access opening on one side thereof and a second sealing flap for engaging a portion around an outer edge of said access opening adjacent said one side; and
        first and second spring means for biasing said first sealing member and said second sealing member, respectively, into sealing engagement with said vehicle;
    said vacuum cleaning system further comprising:
        a duct connected to said air inlet opening; and
        a motor driven fan connected to said duct for drawing air from said vehicle through said access opening and said suction air inlet opening whereby loose material from said vehicle is removed by said air and discharged into said duct for collection in a container.

2. A vehicle vacuum cleaning system according to claim 1, which further comprises a supporting frame and wherein said bellows housing assembly is movable with respect to said supporting frame to position said sealing members for sealing engagement with said vehicle.

3. A vehicle vacuum cleaning system according to claim 2, which further comprises rollers attached to said bellows frame and a roller guide attached to said supporting frame, said rollers being movable along said roller guide to permit movement of said bellows housing assembly so that said sealing members are moved into and out of sealing engagement with said vehicle.

4. A vehicle vacuum cleaning system according to claim 3, which includes two sets of rollers and two roller guides, with each set of rollers being movable along one of said roller guides.

5. A vehicle vacuum cleaning system according to claim 4, which further includes means for attaching said rollers to said bellows frame adjacent a top portion of said bellows frame and means for attaching said roller guides adjacent a top portion of said supporting frame.

6. A vehicle vacuum cleaning system according to claim 3, which further comprises a pair of pneumatic cylinders connected between said bellows frame and said supporting frame to move said bellows housing assembly into and out of sealing engagement with said vehicle.

7. A vehicle vacuum cleaning system according to claim 6, which further comprises a linear bearing attached to each side of one of said bellows frame and said supporting frame and a rod attached to each side of the other of said bellows frame and said supporting framework, each said linear bearing being slidably engaged with one of said rods for movement therealong.

8. A vehicle vacuum cleaning system according to claim 1, wherein said first sealing flap and said second sealing flap are perpendicular to each other.

9. A vehicle vacuum cleaning system according to claim 8, wherein said second sealing flap is wider than said first sealing flap.

10. A vehicle vacuum cleaning system according to claim 9, wherein each of said sealing flaps is comprised of a flap frame, a stiffener attached to said flap frame, a flexible cord attached to an outer edge of said flap frame, and an outer end cover made of a deep pile, fur-like material attached to said flap frame and covering said flexible cord.

11. A vehicle vacuum cleaning system according to claim 10, wherein said stiffener is inflatable.

12. A vehicle vacuum cleaning system according to claim 1, which further comprises a top seal member and a bottom seal member mounted to said bellows frame adjacent the top and the bottom thereof, respectively.

13. A vehicle vacuum cleaning system according to claim 12, wherein said top and bottom seal members are inflatable.

14. A vehicle vacuum cleaning system according to claim 1, which further comprises a hose attache d to a source of air under pressure and an air blaster gun having an air amplifier connected to an outer end of said hose.

15. A vehicle vacuum cleaning system according to claim 14 which further comprises a bracket mounted on a front portion said bellows housing assembly for holding a length of said hose.

16. A vacuum cleaning system according to claim 14, which further comprises a stop/start switch mounted on said bracket.

* * * * *